United States Patent [19]

Moynihan

[11] 4,292,372

[45] Sep. 29, 1981

[54] POLYVINYLBUTYRAL SHEETING

[75] Inventor: Robert E. Moynihan, Lowell, Ohio

[73] Assignee: E. I. Du Pont de Nemours and Company, Wilmington, Del.

[21] Appl. No.: 155,221

[22] Filed: Jun. 2, 1980

[51] Int. Cl.³ .................... C08F 45/38; B32B 19/10; B32B 27/42
[52] U.S. Cl. .................... 428/437; 260/31.4 R; 260/31.6 R; 260/31.8 R; 525/61; 528/315
[58] Field of Search .................... 525/61; 526/315; 428/437; 260/31.4 R, 31.6 R, 31.8 R

[56] References Cited

U.S. PATENT DOCUMENTS

| | | | |
|---|---|---|---|
| 2,120,927 | 6/1938 | Blair | 260/31.4 R |
| 2,412,469 | 12/1946 | Nicholl | 260/31.4 R |
| 3,231,461 | 1/1966 | Mattimoe | 428/437 |
| 3,249,490 | 5/1966 | Lavin | 428/437 |
| 3,262,835 | 7/1966 | Lavin | 428/437 |
| 3,262,837 | 7/1966 | Lavin | 428/437 |
| 4,161,565 | 7/1974 | Hermann | 260/31.6 R |
| 4,230,771 | 10/1980 | Phillips | 428/437 |

Primary Examiner—Ellis P. Robinson

[57] ABSTRACT

Polyvinylbutyral sheeting, plasticized with a hydrolyzable ester, having low acid concentration through the use of formic acid salt as an adhesion control agent.

9 Claims, No Drawings

POLYVINYLBUTYRAL SHEETING

BACKGROUND OF THE INVENTION

Polyvinylbutyral (PVB) sheeting is widely used as an interlayer for laminated safety glass. Typically, the polyvinylbutyral is used in combination with one or more layers of glass to provide a composite which is resistant to shattering. The polyvinylbutyral generally contains a plasticizer to provide a balance of mechanical properties satisfactory for the subsequent handling of the sheeting and performance in a laminar structure. In addition, the polyvinylbutyral sheeting often contains an adhesion control agent to provide a desirable balance between the energy absorbing function of the polyvinylbutyral on impact and adhesion needed to prevent broken glass from being detached from the interlayer when the laminate is broken.

A wide variety of adhesion control agents has been suggested for use with polyvinylbutyral sheeting. However, certain plasticizers used in PVB, including triethylene glycol di-n-heptanoate (3G7) and tetraethyleneglycol di-n-heptanoate (4G7) are usually hydrolyzable. Accordingly, when these plasticizers are incorporated into PVB, the acid concentration of the blend increases markedly with processing. Under these conditions, many adhesion control additives previously suggested for use with PVB are ineffective in providing the desired characteristics in the final product.

SUMMARY OF THE INVENTION

The instant invention provides improved PVB compositions containing an adhesion control agent and a hydrolyzable ester plasticizer which exhibit outstanding performance characteristics.

Specifically, the instant invention provides, in a PVB sheet plasticized with a compatible quantity of hydrolyzable ester selected from the group consisting of triethyleneglycol di-n-heptanoate and tetraethylene glycol di-n-heptanoate, and containing an adhesion control agent, the improvement wherein the adhesion control agent comprises an alkali or alkaline earth metal formate and the sheet has an acid concentration of less than about 10 equivalents of acid per million parts of sheet.

DETAILED DESCRIPTION OF THE INVENTION

The present invention is applicable to PVB plasticized with a hydrolyzable ester selected from triethyleneglycol di-n-heptanoate (3G7) and tetraethyleneglycol di-n-heptanoate (4G7).

The PVB used is typical of that well known in the art, having a hydroxyl content from about 15 to 30% by weight, calculated as vinyl alcohol.

The plasticizers used in the present invention include 3G7, which is available through normal commercial channels, and 4G7. The 4G7 has the following formula:

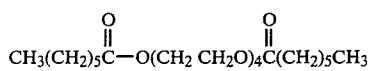

This composition can be prepared by bringing into contact tetraethyleneglycol and heptanoic acid. These compounds are believed to react according to the equation:

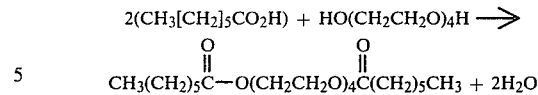

While the desired product will generally be obtained in all proportions of the reactants, for maximum purity of the desired tetraethyleneglycol di-n-heptanoate at least two moles of heptanoic acid should be present for each mole of tetraethyleneglycol. Higher concentrations of the heptanoic acid, for example, up to about 2.5 moles of heptanoic acid for each mole of tetraethyleneglycol, are preferred when no additional catalyst or solvent is used in the reaction.

The reaction of heptanoic acid and tetraethyleneglycol can be carried out without a catalyst. However, the rate and ease of reaction are facilitated by the presence of a catalyst. The catalyst can, and the most basic situation, be a minor excess of the heptanoic acid itself. Other catalysts which can be used include a variety of acids, including sulfuric, formic, polyphosphoric, or p-toluenesulfonic acid and combinations of such acids. The catalyst, when used, is generally present in an amount to equal to about from 0.01 to 5.0 weight percent of the total reactants.

A solvent in addition to the reactants can be used in the preparation of the tetraethyleneglycol di-n-heptanoate if desired. The solvent should be inert to the reactants and should preferably form an azeotrope with the water that is formed in the course of the reaction. Particularly satisfactory and convenient are organic solvents such as toluene, xylene, and benzene.

The preparation of the 4G7 plasticizer can be carried out at ambient temperatures and pressures. However, to facilitate the reaction and for ease of removal of the water formed in the reaction, the synthesis is preferably carried out at elevated temperatures of about from 50° to 300° C. Particularly satisfactory is a temperature equivalent to the boiling point of an azeotrope of water with either the heptanoic acid or solvent used in the reaction.

The water formed by the reaction of the two components is preferably removed during the course of the reaction to both increase the rate of reaction, drive the reaction to completion and to monitor its progress by measurement of the quantity of water generated. The water is conveniently removed by distillation of the azeotrope of water and acid or solvent.

After completion of the reaction, the tetraethyleneglycol di-n-heptanoate can be recovered as a viscous colorless oil. If desired, residual solvent, water, catalyst or other impurities can be removed by conventional purification techniques, including filtration through anhydrous magnesium sulfate or charcoal or by vacuum distillation. The product as prepared frequently contains minor quantities, for example, up to 10 weight percent of various unreacted glycols such as ethylene, diethylene, triethylene and tetraethylene glycols, unreacted heptanoic and alpha-methylhexanoic acids as well as the mono- and diesters thereof.

The plasticizers are admixed with the PVB in the usual fashion in quantities which result in a compatible mixture. It has been found that these plasticizers, while providing outstanding plasticizing characteristics, are hydrolyzed at the temperatures typical of processing of PVB, and especially at the extrusion temperatures used to form sheeting. Moreover, this hydrolysis appears to be accelerated or catalyzed by many additives previously used in the art for adhesion control. The acids generated by this hydrolysis, in turn, result in undesirable adhesion characteristics and significant variation of adhesion with storage of the interlayer.

In accordance with the present invention, metal formate is incorporated into the plasticized PVB sheeting. A wide variety of metals can be used for the cationic portion of the formic acid salt, including the alkali and alkaline earth metals of Groups IA and IIA of the Periodic Table of Elements. Of these, however, metals selected from potassium, magnesium and calcium are preferred for their ready availability and performance characteristics. Potassium formate is especially preferred for the same reasons.

The metal formate is added to the plasticized PVB in any convenient point in the preparation of the final product. However, for maximum effectiveness in controlling the acid concentration of the composition, it is preferred that the metal formate be added prior to or during extrusion of the plasticized PVB resin. The formate is most conveniently added as an aqueous solution.

The quantity of metal formate used in the instant invention should be sufficient to adjust the adhesion of the sheeting to the desired level and, at the same time, to reduce the acid concentration of the final composition, as measured by titration, to less than 10 equivalents of acid per million parts of sheet. The particular quantities necessary to achieve this level will necessarily vary considerably with the particular PVB composition and the processing characteristics. In general, quantities of about from 50 to 1500 parts of the metal formate per million parts of sheeting will be added under normal operating conditions. Higher quantities of up to about 5000 parts of the metal formate may be needed with correspondingly elevated processing temperatures and with the presence of other additives which similarly promote the hydrolysis of the plasticizers. A single metal formate or a combination of two or more metal formates can be used.

When potassium formate alone is used, about from 400 to 1500 parts of additive to per million parts of sheeting are preferred. When calcium or magnesium formates are used, about from 50 to 500 parts of additive are preferred.

While the metal formate, in the course of processing of the sheeting, partly reacts with other components, the quantity of metal formate in the sheeting is calculated on the basis of the metal cation remaining after such processing.

The metal formates of the present invention can be used in conjunction with a wide variety of other adhesion control agents and other additives used in PVB sheeting production. Representatives of such additives are colorants, ultraviolet absorbers, and stabilizers.

Other metal carboxylates can be used effectively in conjunction with the metal formates. However, in view of the catalytic effect on the plasticizer hydrolysis noted above, increased quantities of the metal formate are needed to achieve the required acid concentration in the presence of such carboxylates.

The reduction of acid concentration in the present system through the presence of metal formates results in PVB sheeting that combines excellent adhesion control with the benefits resulting from 3G7 and 4G7 plasticizers. The resulting PVB can therefore be used effectively with laminates with one or more layer of glass. The sheeting can be laminated according to the procedures generally used in the art and illustrated, for example, in U.S. Pat. Nos. 2,293,656, 3,838,091 and 4,107,366.

The present invention is further illustrated by the following specific examples, in which parts and percentages are by weight unless otherwise indicated.

In these Examples, the following tests and procedures were used:

PVB Residual Hydroxyl (weight % as PVA): ASTM D 1396

Pummel Adhesion: SAE J 1208

Penetration Resistance: ANSI Z26.1 using a staircase method to determine mean break height instead of the one level test of Z26.1 as described in U.S. Pat. No. 3,718,516 and using a 5-pound ball.

Acid Concentration Analysis: A 7.00 g sample of sheeting is dissolved in 250 ml of preneutralized methanol at ambient temperature. A 20.0 ml aliquot of 0.01 N methanol solution of hydrochloric acid is added and the solution is titrated with a standardized 0.05 N methanol solution of tetrabutylammonium hydroxide. The pH is recorded as a function of the volume of titrant. An additional aliquot, the same 0.01 N hydrochloric acid solution is titrated as a blank. Acid concentration is calculated as the difference in volumes required to reach the end point at a pH of about 9.5

Compressive Shear Test: The adhesion of the samples to glass was measured by the following procedure. For each test, five one inch square specimens are cut from PVB/glass laminate with a water-cooled glass cutoff saw with a diamond or carborundum blade. The area of each specimen is measured to the nearest 0.001 inch. Each specimen is held at a 45° angle to a supporting table in a compression testing machine and a compressive force is applied to the sample at the rate of 0.1 inch per minute. The force required to break the bond between the glass and the interlayer is recorded and the compressive shear strength is calculated according to the formula:

$$\text{Compressive shear strength (psi)} = \frac{\text{Force (pounds) required to break bond}}{\text{Area of sample to 0.001 square inch}}$$

The average for the five specimens is reported for the sample.

In general, good impact performance is attained at a compressive shear test result of 800 to 2600 psi and a pummel adhesion of about from 2 to 7.

EXAMPLE 1

A mixture consisting of 100 parts of PVB resin with a residual vinyl alcohol concentration of 23%, 38 parts of tetraethylene glycol di-n-heptanoate and 35 parts of recycle from a previous similar extrusion was fed to an extruder along with an aqueous solution of potassium formate sufficient to give 530 parts per million (ppm) potassium in the final sheeting product. A sheet having a thickness of 0.03 inch was prepared from the blend. The acid concentration of the resulting sheeting was 7.4 equivalents of acid per million parts of sheeting.

The sheeting was conditioned to 0.52% water content and laminated to two sheets of glass according to normal laminating procedures. The adhesion was tested and found to be 1300 psi by the Compressive Shear Test. Windshields were fabricated in a commercial process at 0.50% interlayer moisture. Samples of these windshields were tested and found to exhibit a pummel adhesion of 3 and a mean penetration height in the five-pound ball impact test of 23 feet.

COMPARATIVE EXAMPLE A

The general procedure of Example 1 was repeated, except that the adhesion control additive blended with the PVB was an aqueous solution containing both potassium acetate and potassium formate in a mole ratio of 80:20 to give 520 ppm potassium in the final sheeting. The resulting sheeting had an unacceptably high acid concentration of 13.0 equivalents. Compressive shear adhesion measurements on laminates of the samples conditioned to 0.47 and 0.69% water content were 4839 and 3308 psi, respectively. Windshields prepared and tested exhibited a pummel adhesion of 8 and a mean penetration height of nine feet.

COMPARATIVE EXAMPLE B

The general procedure of comparative Example A was repeated, except that the mole ratio of potassium acetate to potassium formate was 40:60, and the product contained 480 ppm of potassium. The sheeting had an acid concentration of 13.9 and, when laminated at 0.49% water content, had a compressive shear adhesion of 5100 psi.

EXAMPLE 2

The general procedure of Example 1 was repeated, except that sufficient potassium formate additive solution was used to give 370 ppm potassium in the product sheeting. The acid concentration in the resulting sheeting was 4.8 equivalents of acid per million parts of resin. A sample of the sheeting was conditioned to 0.52 percent water content and laminated. Adhesion was 2700 by the compressive shear test. Windshields fabricated under the conditions of Example 1 at an interlayer water content of 0.48 percent had a pummel adhesion of 6 and a mean penetration height of 22 feet.

COMPARATIVE EXAMPLE C

One hundred parts of dry polyvinylbutyral resin, 38 parts of tetraethyleneglycol diheptanoate and sufficient aqueous solution of a potassium acetate/potassium formate mixture to give 370 ppm potassium in the product were combined in a twin-screw extractor-extruder at a melt temperature of about 200° C. The mole ratio of potassium acetate to potassium formate was 2:1 in the additive solution. The product sheeting had an acid concentration of 13.5. A laminate of this sheeting at a water content of 0.56 percent had a compressive shear adhesion of 3600 psi. After storage in a roll for 27 weeks at ambient conditions, coated with sodium bicarbonate to prevent blocking, washed sheeting had an acid concentration of 1.2. A laminate of this aged sheeting at a water content of 0.55 percent had a compressive shear adhesion of 1500 psi.

COMPARATIVE EXAMPLE D

The general procedure of Example C was repeated, except that the melt temperature was about 180° C. and an aqueous solution of potassium hydroxide was used in the adhesion control agent in sufficient quantity to give 324 ppm potassium in the product. The sheeting had an acid concentration of 7.4.

EXAMPLE 3

The general procedure of Example C was repeated, except that sufficient aqueous solution of potassium formate was used to give 360 ppm potassium in the product. The sheeting had an acid concentration of 5.4. A laminate of this sheeting at a water content of 0.52 percent had a compressive shear of 1700 psi. After storage as described in Comparative Example C for 14 weeks, the sheeting had an acid concentration of 1.2 and a laminate of the washed sheeting at a water content of 0.53 percent had a compressive shear of 1600 psi.

COMPARATIVE EXAMPLE E

The general procedure of Example C was repeated, except that the melt temperature was 195° C. and an aqueous solution of potassium acetate was used in sufficient quantity to give 380 ppm potassium in the product. The resulting sheeting had an acid concentration of 8.5.

EXAMPLE 4

The general procedure of Example E was repeated, except that the additive solution was an aqueous solution of potassium formate in sufficient quantity to give 340 ppm potassium in the product sheeting. The acid concentration was 3.8.

COMPARATIVE EXAMPLE F

The general procedure of Example C was repeated, except the melt temperature was 195° C. and sufficient aqueous calcium acetate was added for an alkaline titer of 75 in the product sheeting. The sheeting had an acid concentration of 7.5.

EXAMPLE 5

The general procedure of Example F was repeated, except sufficient aqueous calcium formate was added to give the product sheeting an alkaline titer of 75. The sheeting had an acid concentration of 3.0.

COMPARATIVE EXAMPLE G

The general procedure of Example C was repeated, except that the melt temperature was 180° C. and an aqueous solution of magnesium heptanoate was used in sufficient quantity to give 84 ppm of magnesium in the product. The sheeting had an acid concentration of 10.0.

EXAMPLE 6

The general procedure of Example G was repeated, except that an aqueous solution of magnesium formate was used in sufficient quantity to give 74 ppm magnesium in the product. The sheeting had an acid concentration of 3.3.

COMPARATIVE EXAMPLE H

The general procedure of Comparative Example C was repeated, except that the plasticizer used was triethyleneglycol diheptanoate; the melt temperature was 185° C. and sufficient aqueous solution of potassium acetate was added to give 480 ppm potassium in the product. Analysis of the sheeting gave 16.1 equivalents of acid per million parts of sheeting.

EXAMPLE 7

The general procedure of Example H was repeated, except that sufficient aqueous solution of potassium formate was added, instead of the potassium acetate, to give 440 ppm potassium in the product. Analysis gave 7.9 equivalents of acid per million parts of sheeting.

Laminates of the sheeting of Examples 7 and H were prepared and equilibrated at 18% RH. The laminates were tested and exhibited the following results:

|  | Example | |
| --- | --- | --- |
|  | 7 | H |
| Mean Penetration Height | 21.8 ft. | 12.5 ft. |

I claim:

1. In a PVB sheet plasticized with a compatible quantity of hydrolyzable ester selected from the group consisting of triethyleneglycol di-n-heptanoate and tetraethylene glycol di-n-heptanoate, and containing an adhesion control agent, the improvement wherein the adhesion control agent comprises an alkali or alkaline earth metal formate and the sheet has an acid concentration of less than about 10 equivalents of acid per million parts of sheet.

2. A plasticized PVB sheet of claim 1 wherein the metal formate is present in an amount of about from 50 to 1500 parts per million parts of sheeting.

3. A plasticized PVB sheet of claim 1 wherein the metal formate is selected from at least one of the group consisting of potassium formate, magnesium formate, and calcium formate.

4. A plasticized PVB sheet of claim 3 wherein the metal formate consists essentially of potassium formate in an amount of about from 400 to 1500 parts per million parts of sheeting.

5. A plasticized PVB sheet of claim 3 wherein the metal formate is selected from the group consisting of magnesium formate and calcium formate in an amount of about from 50 to 500 parts per million of sheeting.

6. A plasticized PVB sheet of claim 1 wherein the plasticizer consists essentially of tetraethyleneglycol di-n-heptanoate.

7. A plasticized PVB sheet of claim 1 wherein the plasticizer consists essentially of triethyleneglycol di-n-heptanoate.

8. In a laminar structure comprising at least one layer of glass and a sheet of polyvinyl butyral plasticized with a compatible quantity of at least one hydrolyzable ester selected from the group consisting of triethyleneglycol di-n-heptanoate and tetraethyleneglycol di-n-heptanoate, the improvement wherein the polyvinylbutyral comprises at least one adhesion control agent selected from alkali and alkaline earth metal formates and the polyvinyl butyral sheet has an acid concentration of less than about 10 equivalents of acid per million parts of sheet.

9. In a process for the preparation of PVB sheet by blending polyvinylbutyral, a compatible quantity of at least one hydrolyzable ester plasticizer selected from the group consisting of triethyleneglycol di-n-heptanoate and tetraethyleneglycol di-n-heptanoate and an adhesion control agent, and extruding the blend to form a sheet, the improvement which comprises adding to the blend, as an adhesion control agent, about from 50 to 1500 parts, per million parts of sheeting, of at least one alkali or alkaline earth metal formate in an amount to provide on acid concentration in the sheet of less than about 10 equivalents of acid per million parts of sheet.

* * * * *